E. TREADWELL.
Bake Oven.
No. 487.
Reissued Aug. 25, 1857.
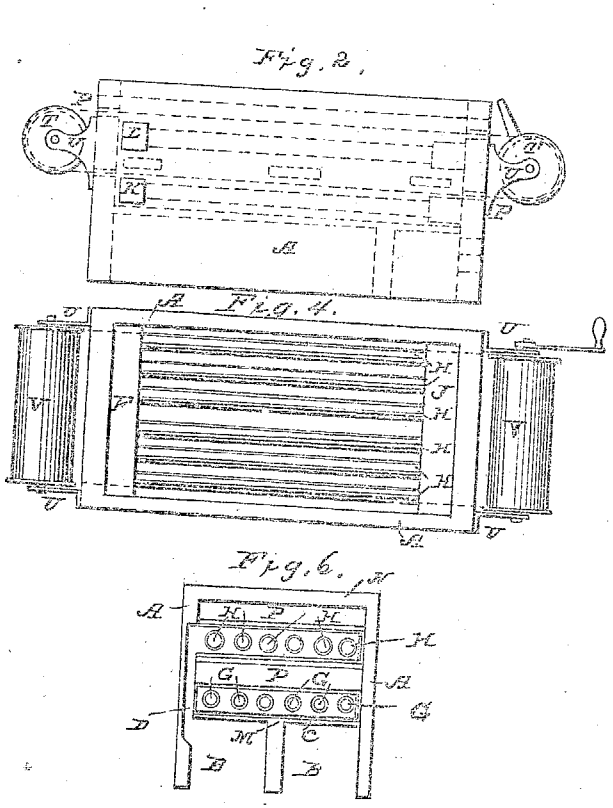
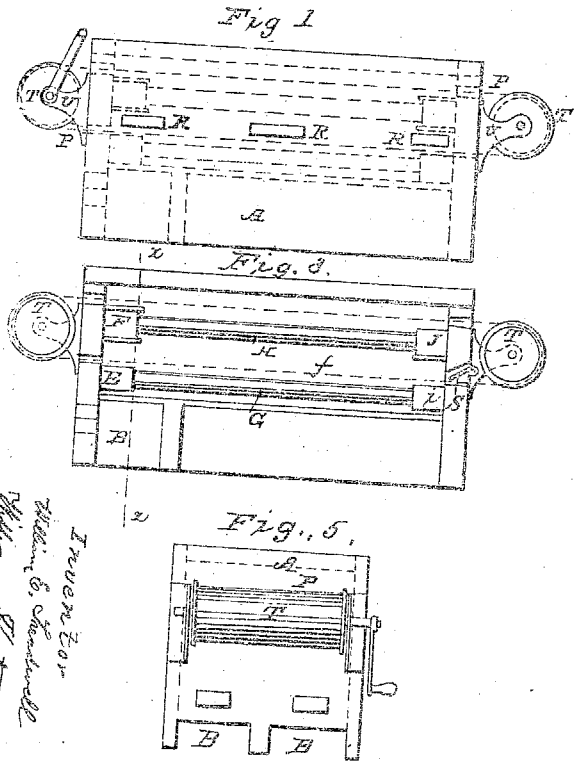
Inventor
William E. Treadwell
William Thistad

UNITED STATES PATENT OFFICE.

BEST AVAILABLE COPY

WM. E. TREADWELL AND WM. HUSTACE, OF NEW YORK, N. Y., EXECUTORS OF EPHRAIM TREADWELL, DECEASED.

IMPROVEMENT IN OVENS.

Specification forming part of Letters Patent No. 9,864, dated July 19, 1853; Reissue No. 487, dated August 25, 1857.

*To all whom it may concern:*

Be it known that we, WILLIAM E. TREADWELL and WILLIAM HUSTACE, executors of EPHRAIM TREADWELL, deceased, late of the city, county, and State of New York, do hereby declare that the following is a full, clear, and exact amended description of the improvements in progressive or perpetual ovens for baking bread, crackers, and other articles invented by EPHRAIM TREADWELL, deceased, aforesaid, reference being had to the drawings making part of this specification.

In the drawings, Figure 1 is a view of that side of the oven on which the operator stands to introduce the dough and withdraw it when baked. Fig. 2 is a view of the other side of the oven, showing the apertures which connect with the chimney. Fig. 3 is a longitudinal vertical section through the oven. Fig. 4 is a horizontal section taken just above the upper tier of flues. Fig. 5 is an end view of the oven, showing the fire-doors and ash-pits, and Fig. 6 is a transverse vertical section on the line X X of Fig. 3.

The improvements invented by the aforesaid EPHRAIM TREADWELL, deceased, relate exclusively to that class of ovens in which the dough to be baked is carried lengthwise of the oven by means of an endless band or chain, or some equivalent thereof, and are intended to serve important purposes, such as the more equable baking of the dough, by means of a provision which enables the attendants to regulate to a sufficient extent the amount of heat imparted to the several surfaces of the bread, and the more easy working of the oven as far as regard charging the dough and withdrawing bread or crackers, while opportunity is at the same time afforded for observing the effects of heat on articles contained in the oven.

To this intent the nature of the first part of his invention consists in constructing the oven with two or more fire-places or sets of fire-places connected with two proper sets of flues, one set being located on each side of an endless band or its equivalent, which carries the dough in such manner that the flues on opposite sides shall be connected with different fire-places, whereby the heat in one set of flues may be regulated independently of the amount of heat afforded by the other set, substantially as hereinafter set forth; and the nature of the second part of his invention consists in combining with an endless apron or band, or their equivalents, side doorways or apertures in such manner, substantially as hereinafter specified, that the dough may be entered and discharged when baked in lines perpendicular, or nearly so, to the direction of motion of the apron.

In the drawings the outer wall or casing of the oven, which may be constructed of any proper material, is represented at A A. At one end of the oven are constructed two furnaces or fire-places, B B, one of which connects directly, by means of an opening, C, with a box or connection, E, from which lead a series of flues, G G G, whose other extremities open into another box or chamber, I, at that end of the oven farthest from the furnaces. The other furnace B is, by means of an uptake or connecting-passage, D, in connection with a box, F, from which another set or series of flues, H H H, extend until they reach and open into another chamber, J, also at that end of the oven farthest from the furnaces. The oven has a proper bottom and roof, and is provided with drums T T, over which an endless apron is passed, which extends through the oven. This apron is shown at P. Apertures or doorways R R R are constructed in the side of the oven, so that dough may be entered near one end thereof in a line perpendicular to the line of motion of the endless apron or chain, and withdrawn in a similar direction either near the other end or at some intermediate point. A scraper, S, is pivoted at one end of the oven upon a suitable hinge in such manner that one end thereof lies upon the apron, as shown in the drawings. This is a useful adjunct in the precise arrangement of oven there shown, as it would prevent bread that was not withdrawn at the proper time from being carried between the apron and drum or barrel. The chambers at those ends of the flues farthest from the furnaces are, by means of openings K L through the outer casing, connected with any convenient flue or chimney.

In the drawings one furnace only is shown in connection with each set of flues. There may be, however, any convenient number of furnaces so long as each of them connects with one or more flues on one side of the apron only, and cannot discharge heat or flame into flues on both sides of the apron.

The flues shown in the drawings are cylindrical. They may be of any convenient form, constructed of any suitable material or combination of materials, and may or may not be separated entirely from the outer casing of the oven.

In an oven such as is thus described the fires in one furnace or set of furnaces may be regulated by any ordinary means entirely independently of the fire in the other furnaces, and the heat radiated or reflected upon one side of the apron may be diminished or increased without varying the amount of heat imparted to the other side of the apron, thus regulating the heat applied to various surfaces of dough carried by the apron. The side doors as contrasted with the end doors formerly used in endless chain ovens admits of the fire-doors and furnaces being located at one end of the oven without interfering with the charging and discharging, and one end is the proper place for the furnaces, as the dough ought to be exposed to the greatest heat when first entered into the oven. This arrangement of doors also permits, if desired, the use of both parts of an apron or chain for baking purposes, and also admits of inspection of the bread during its passage through the oven, the intermediate side doors also affording facilities for the withdrawal of bread before it has passed through the whole extent of the oven. It is, moreover, in practice found more convenient to charge across an apron or chain than in lines parallel to its line of motion. The precise number and arrangement of flues or furnaces and connections is unimportant, so long as the amount of heat imparted to one side of the apron is capable of being regulated independently of that imparted to the other side, substantially in accordance with the principles herein set forth, and the precise location, number, and arrangement of the charging and withdrawing apertures may be regulated by convenience or fancy so long as they are in such positions that dough can be entered and withdrawn at right angles, or nearly so, to the direction of motion of an endless apron or chain.

The practical baker will be enabled to carry out the principles or mode of operation of this invention under arrangements differing from those shown in the drawings by bearing in mind the facts that independent regulation of the heat in opposite sides of the chain or apron and facility for charging and discharging across the chain are the features upon which the arrangements shown in the drawings are based, and it will also be clear that side doors, as described, in combination with a chain, will be applicable and useful in ovens which have ordinary arrangements of heating-flues not susceptible of independent regulation in the manner herein specified.

Now, it was well known to EPHRAIM TREADWELL, deceased, and is known to us, that an endless apron or chain oven was invented and patented by Hosea Ball in the year 1850, and that his oven had heating-flues on both sides of the chain; but in that oven there was no provision for regulating the heat independently on either side of the chain, no provision which permitted both sides of the chain to be used for baking purposes, and no contrivance which permitted of charging or discharging across the chain in lines perpendicular to its line of travel.

What is claimed as the invention of EPHRAIM TREADWELL, deceased, aforesaid, is—

2. The combination of flues and furnaces, substantially such as are hereinbefore specified, with an endless apron or its equivalent, substantially in the manner hereinbefore described, whereby the amount of heat imparted to either side of an apron or chain may be regulated independently.

2. In combination with an endless apron and oven or their equivalents, discharging and charging apertures, located substantially as hereinbefore set forth, in such manner that dough may be charged and withdrawn in lines perpendicular, or nearly so, to the line of motion of an endless apron.

In testimony whereof we have hereunto subscribed our names, in the city of New York, on the 31st day of July, A. D. 1857.

WILLIAM E. TREADWELL,
WILLIAM HUSTACE,
*Executors.*

In presence of—
STEPHEN KEELER,
THOMAS M. TALMAN.